United States Patent
Shiota et al.

[11] 3,907,482
[45] Sept. 23, 1975

[54] ROTATIONAL MOLDING APPARATUS

[75] Inventors: Akihiro Shiota, Hirakata; Atsuo Okabe, Asaka; Hideo Okada, Hirakata, all of Japan

[73] Assignee: Sekisui Kagaku Kogyo Kabushiki Kaisha, Osaka, Japan

[22] Filed: Jan. 2, 1974

[21] Appl. No.: 430,125

[30] Foreign Application Priority Data
Dec. 29, 1972 Japan.................................. 48-3602

[52] U.S. Cl. ................ 425/435; 425/261; 425/453; 425/DIG. 201
[51] Int. Cl.² ............................................. B29C 5/04
[58] Field of Search ........... 425/134, 261, 347, 434, 425/435, 453, 454, DIG. 200, DIG. 201

[56] References Cited
UNITED STATES PATENTS

| | | | |
|---|---|---|---|
| 2,027,165 | 1/1936 | Grubman | 425/DIG. 201 |
| 2,112,513 | 3/1938 | Abbott, Jr. et al. | 425/DIG. 201 |
| 2,347,117 | 4/1944 | Luxenberger et al. | 425/DIG. 201 |
| 2,497,212 | 2/1950 | Donofrio | 425/237 X |
| 2,596,052 | 5/1952 | Stockmar | 425/453 X |
| 3,189,971 | 6/1965 | Derror | 425/453 |
| 3,315,314 | 4/1967 | Barnett et al. | 425/454 X |
| 3,801,255 | 4/1974 | Meyer et al. | 425/453 X |
| 3,822,980 | 7/1974 | Graeper | 425/435 X |

*Primary Examiner*—Robert L. Spicer, Jr.
*Attorney, Agent, or Firm*—Sughrue, Rothwell, Mion, Zinn & Macpeak

[57] ABSTRACT

Rotational synthetic resin molding apparatus comprising first guide track extended between a molded article withdrawal station and a material feeding station, a plurality of second guide tracks arranged substantially in parallel with said first guide track and respectively passing through heating furnaces and cooling chambers, and third guide tracks provided on the both sides of said first and second guide tracks mounted with carriages capable of reciprocating in the direction substantially perpendicular to said first and second guide tracks and having rack carrying tracks capable of joining said first and second guide tracks, aforesaid tracks forming together a plurality of circulating paths consisting of the material feeding station, the heating furnace, the cooling chamber, and the molded article withdrawal station arranged successively while utilizing said material feeding station and said molded article withdrawal station in common, and a plurality of mold rotating and mounting racks having electric motors for the rotation of molds and self-travelling motors for the movement along said circulating paths so as to melt and mold synthetic resin in the course of moving along said circulating paths.

7 Claims, 10 Drawing Figures

ROTATIONAL MOLDING APPARATUS

BACKGROUND OF THE INVENTION

1. Field of the Invention

This invention relates to a rotational molding apparatus for synthetic resin and it particularly relates to a rotational molding apparatus for synthetic resin for the molding of various molded articles such as large sized transportation pallets and the likes from synthetic resin in which synthetic resin material is placed inside of a casting mold and melted by heating with said mold being rotated and cooled with the mold being kept to rotate causing the melts inside of the mold to solidify thereby molding the casted articles of synthetic resin into a desired configuration.

2. Description of the Prior Art

In the conventional apparatus of the type in which racks provided with rotary molds are successively passed through heating furnaces and cooling furnaces for the molding, a circulating path is made by serially connecting a material feeding station, heating furnace, cooling chamber and the molded article withdrawal station. In such apparatus, however, the heating and cooling operations require relatively longer time in each of the steps, while the operations for the feeding material and withdrawing the melted and solidified molded articles require not much time and latter operations can be achieved with much less time as compared heating and cooling operations. Therefore, the racks must wait for prolonged period just before said heating furnace and it causes a defect that effective operation based on the rational layout as a whole is utterly impossible.

A rotational molding apparatus for synthetic resin of the prior art in which a plural of annular tracks, a part of which is in common, are provided and the heating furnace and the cooling chamber are respectively provided on each of the annular tracks can not be installed in a restricted space since the circulating paths thereof are circular and, therefore, require extremely wide space for providing three or more such paths although they are partially used in common. Moreover, the length of the plural tracks significantly differs between the inside and outside tracks and so the distance between the heating furnace and the cooling chamber also differs, which varies the conditions for each of the heating and cooling with every track causing the uneveness in the quality of the molded products. The distance between the heating furnace and the cooling chamber may be equalized but it results in the drawback that most part of the outside track become useless.

Moreover, electric motors mounted on said racks as driving source for the rotation of the molds have a generally poor tolerance for the heat and, therefore, cause the reduction in performance and troubles when placed for long periods in the heating furnace and heated together with the molds. In addition, it is required in the conventional rotational molding apparatus for synthetic resin to hoist the heavy molds by way of chain block and the like to release from the mold rotating means and then carry to the operation platform for dismantling the molds when taking out the molded products from the molds by splitting said molds if the molded articles are large and heavy. This is disadvantageous since the transporting operation requires labor and time, as well as the operation for taking out large molded products which is not easy because it is manually performed.

The conventional molds for use with rotational molding comprise a plurality of mold parts having at the mating faces thereof projected plates respectively formed with a plurality of bolt insertion holes and the molds are closed by inserting bolts through said insertion holes and clamping the same with nuts, but they have a defect that the operation for dismantling the molds to takeout the molded articles is laborous and time consuming because the plurality of bolts and nuts have to be removed individually by using tools such as wrenches for removing the articles casted by rotational molding from the molds.

SUMMARY OF THE INVENTION

An object of this invention is to overcome the foregoing disadvantages in the synthetic resin molding apparatus of the prior art and provide a rotational molding apparatus for synthetic resin which enables the rational layout with the entire system for effectively utilizing the space for the operation site as well as effective mass production with less labor thus attaining excellent utility for the installation of the apparatus and the effectiveness of the production. These advantages are achieved by movably arranging racks capable of mounting thereon the molds while rotating said molds on the simple circulating paths, and disposing along said circulating paths a material supply station, heating furnace, cooling chamber and molded article withdrawal station in this sequence thereby enabling the entire apparatus to locate in a short length and narrow width, and simultaneously performing material feeding and article withdrawal by closely arranging the material feeding station and the molded article withdrawal station thus to carry out the molding operation effectively by the successive circulation of the racks.

Another object of this invention is to provide a novel and useful synthetic resin molding apparatus which can perform within a space as narrow as possible the effective operation based on the rational layout by serially connecting the material feeding station and the molded article withdrawal station and providing a plurality of paths including the combination of the heating furnace and the cooling chamber substantially in parallel with the connection path for the material feeding station and the molded article withdrawal station while utilizing both stations in common.

A further object of this invention is to provide a synthetic resin molding apparatus comprising improved heating furnaces so as not to heat directly the driving source mechanism for the rotation of the molds mounted on racks while the latter pass through the heating furnaces, characterized by providing a driving source mechanism on a lateral side of the racks and properly spacing apart said driving source mechanism and the molds, providing notched channels over the entire side walls of the furnaces in the horizontal direction, situating the molds in the furnace and passing the racks therethrough while situating the driving source mechanism outside of the furnace to thereby protecting the driving source mechanism against the heat extremely economically.

A further object of this invention is to provide a rotational molding apparatus for synthetic resin in which the molded articles in the said molds can be withdrawn without releasing the molds from the mold rotating means.

A still further object of this invention is to provide a mold capable of simplifying the mold closing and slitting operations for use with rotational molding of synthetic resin.

Additional objects other than these specifically stated will become apparent on consideration of the accompanying drawings and when considered in conjunction with the specification and claims.

The rotational molding apparatus for synthetic resin according to this invention is to be described in details by way of the embodiments thereof referring to the accompanying drawings.

Figure 1:
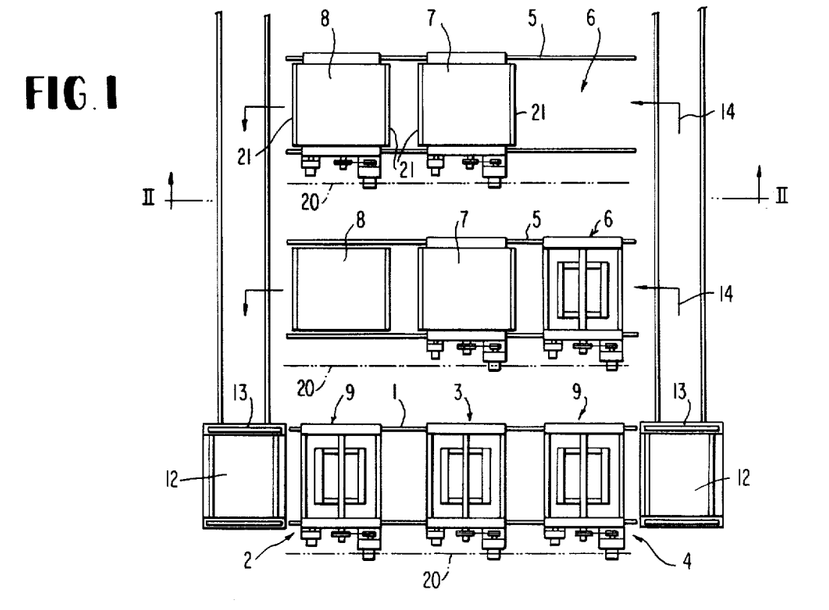
FIG. 1 is a partially cut out plan view of the entire portion of the rotational molding apparatus for synthetic resin according to this invention.
Figure 2:
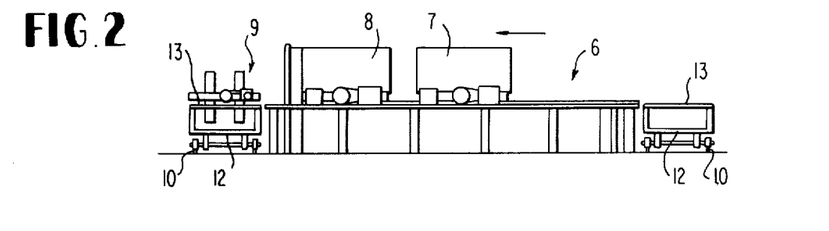
FIG. 2 is a side sectional view along lines II — II in FIG. 1.

In the drawing, the reference numeral 1 denotes a linearly laid guide track on which a molded article withdrawal station 2, waiting station 3, and material feeding station 4 are provided in this sequence. Aside from the guide track 1, a plural of guide tracks 5 are arranged substantially in parallel with said guide tracks 1 and closely related to each other. At the ends of said guide tracks 5 nearer to the material feeding station 4, waiting stations 6 are formed respectively and the heating furnaces 7 and the cooling chambers 8 are properly located on the tracks 5 respectively. A guide track 10 is laid between the delivery side of the racks 9 of said material feeding station 4 and each of the reception sides for the racks 9 of each of said waiting stations in perpendicular to said guide tracks 1, 5, and a guide track 11 is also laid between the reception side for the racks 9 of said molded article withdrawal station 2 and each of the delivery side for the racks 9 of each of said cooling chamber 8 in perpendicular to said guide rails 1, 5 and reciprocating carriages 12, 12 are mounted on said guide tracks 10, 11. On the upper face of said carriages 12, 12, a rack mounting track 13 connectable to each of said tracks 1, 1 ... and for mounting said racks 9 are respectively provided to thereby form a plural rows of circulating paths 14 ... along which a plural of racks 9 move through the material feeding station 4, waiting stations 6, heating furnace 7, cooling chamber 8, molded article withdrawal station 2 and waiting station 3 in this sequence while said molded article withdrawal station 2, waiting station 3 and material feeding station 4 are used in common with each other.

Figure 3:
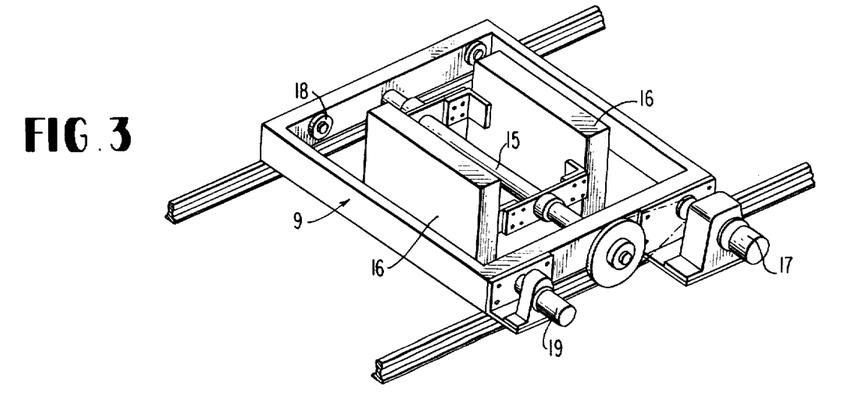
FIG. 3 is a perspective view of a rack mounted with a mold.

The rack 9 is provided with, as shown in FIG. 3, a journaled rotating shaft 15 which is detachably mounted with two molds 16, 16 and an electric motor 17 for rotatively driving said rotating shaft. Although the molds 16, 16 mounted in the rack 9 may differ from these mounted in other racks, the two molds 16, 16 provided in the same rack 9 should always be of the same or similar configuration. The rack 9 is further provided with a plurality of wheels 18 and a selftravelling electric motor 19 for rotatively driving said wheels 18 so that it can travel along said guide tracks 1, 5 . . . and it is also adapted to switch between said guide tracks 1, 5 ... and rack mounting track 13 of said carriages 12, 12 each other. A conductive wire 20 is provided along each of said guide tracks 1, 5 ... respectively and a brush, not shown, is contacted for supplying power to said motors 17 and 19.

Each of the heating furnaces 7 and the cooling chambers 8 described above is constructed so as to house each one rack 9 and said furnaces 7 and cooling chambers 8 are cut at the side walls thereof with horizontally notched channels for situating the wheels 19, bearing portions of the rotating shaft 15 and both of the electric motors 17 and 19, etc. outside of the furnaces and chambers. The carriages 12, 12 are also disposed with self-travelling electric motors (not shown) respectively and adapted to be supplied with electric power from the conductive wires not shown. The carriages 12, 12 are built with means for receiving and delivering the racks 9 or with the electric power supply wires for the racks 9 so as to automatically receive and deliver said racks 9. The use of the carriages 12, 12 for travelling the racks 9 is very advantageous in that the apparatus can effectively be installed in a saved space and the operation can easily be controlled. It will easily be understood that the number of said circulating paths can optionally be selected depending on the number of the molded articles, molding conditions, facility cost, etc. In FIG. 1, the reference number 21 denotes automatic doors for closing and opening the exit and entrance for the heating furnaces 7 and the cooling chambers 8.

The operation of the molding apparatus of this invention is to be described hereinafter. The material is fed at first in the molds 16, 16 mounted on a rack 9 and, thereafter, the rack automatically travels to ride on a rack mounting track 13 of a carriage 12. Then the carriage 12 automatically selects a circulating path which satisfies predetermined conditions, travels by itself in front of its waiting station 6 and stops, and delivers the rack 9 to the waiting station 6. After that, the carriage 12 returns its initial position and repeats said operation thereafter. The rack 9 handed to said waiting station 6 travels by itself into a heating furnace 7 at the time when said heating furnace 7 is put to predetermined conditions and opens its entrance door 21. Then, entrance door 21 is closed and the molds 16, 16 caused to rotate and they are heated while being rotated. The heating, after effected for the adequate perioid, is automatically stopped, the exit door 21 of the heating furnace 7 is opened and the rack 9 travels by itself out of the heating furnace into the cooling chamber 8. The molds 16, 16 may continue to rotate or stop in the course of leaving the heating furnace 7 and entering the cooling chamber 8. Thereafter, the heating furnace 7 automatically closes its entrance door 21 and prepares for the heating conditions required for receiving the next rack 9.

In the same manner, when the rack enters the cooling chamber 8, the entrance and exit doors 21 of said chamber 8 are simultaneously closed and the cooling is started by way of the spray of cooling water. When the cooling for the molds 16, 16 are thus completed automatically, the exit and entrance door 21 for the cooling chamber 8 are simultaneously opened and the rack 9 waits in the cooling chamber 8 until a carriage arrives therefor. In this embodiment, a system is employed in which heating conditions in said heating furnace 7 and cooling conditions in said cooling chambers 8 are properly predetermined depending on the type of the molds 16, 16 provided in the racks 9 or the like and loaded on an electronic computer and said proper conditions are selected by sending electric signals when a rack enters the heating furnace 7 or cooling chamber 8. Then, at signals of indicating the completion of the cooling, the carriage 12 travels by itself to the rack 9 and stops as they are completed with the cooling successively. Then, the carriage 12 is mounted with the rack 9 and returns to its initial position to move the rack 9 just before the molded article withdrawal station 2, and the rack 9 is delivered to said withdrawal station 2 if it is not occupied and the molded articles in the molds 16, 16 are taken out there. Thereafter, the rack unloaded with the molded articles travels by itself by way of the waiting station 3 to the material feeding station 4, and raw material is fed again into the molds 16, 16 of the rack 9 and the aforesaid operations are repeated. Metering means for the raw material is provided on the material feeding station 4 (not shown in the drawing) for automatically metering the material corresponding to the single amount delivered by the rack 9 from said material feeding station 4 depending on the types of the molds 16, 16 and feeding the same into said molds 16, 16.

As illustrated by way of an embodiment, since the rotational molding apparatus of this invention comprises guide track 1 extended between a molded article withdrawal station 2 and a material feeding station 4, a plurality of other tracks 5 . . . extended substantially in parallel with said guide 1 and connecting heating furnace 7 and cooling chambers 8 and carriages 12, 12 capable of travelling reciprocatingly over each of the ends of guide tracks 1, 5 . . . situated on the same sides in the directions substantially perpendicular to each of said guide tracks and having rack mounting rails 13 capable of communicating said guide tracks 1, 5 . . . so as to establish circulating paths 14 . . . connecting the material feeding station 4, heating furnace 7, cooling chamber 8 and molded article withdrawal station 2 in this sequence while using said molded article withdrawal station 2 and material feeding station 4 in common, each of the circulating paths 14, 14 . . . forms a rectangular shape with corners substantially meeting at right angles and, therefore, the circulating paths can be located closely to each other being densely arranged in the restricted space. Moreover, since the molded article withdrawal station 2 and the material feeding station 4 are utilized in common, it is advantageous in space saving and the rational layout for the entire apparatus although a plurality of circulating paths 14 . . . are provided. In addition, effective molding operation and, in particular, the ideal molding operation for the mass production can be achieved by travelling a plurality of racks 9 mounted with molds 16, 16 . . . along the circulating paths 14, 14 . . . .

Figure 4:
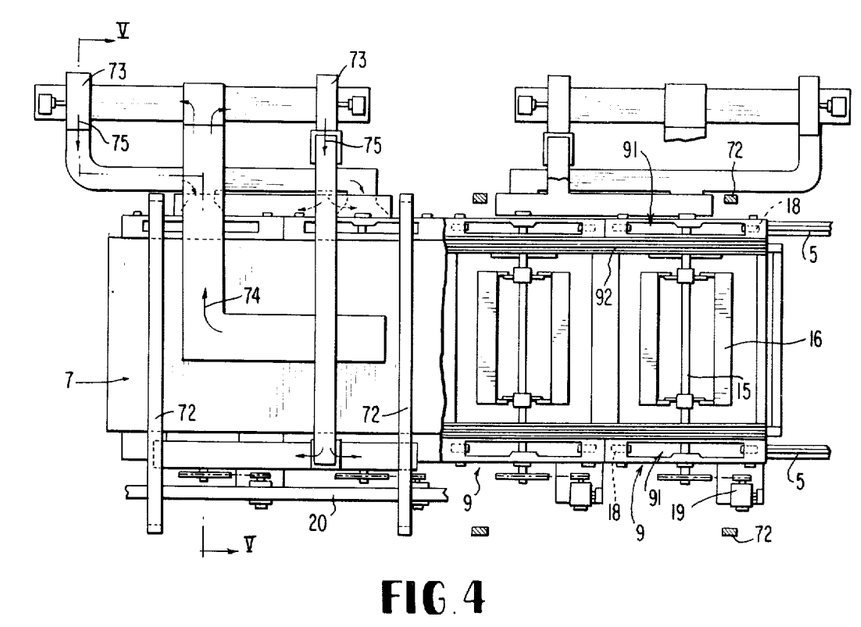
FIG. 4 is a partially cut out plan view of a heating chamber in the rotational molding apparatus for synthetic resin according to this invention.
Figure 5:
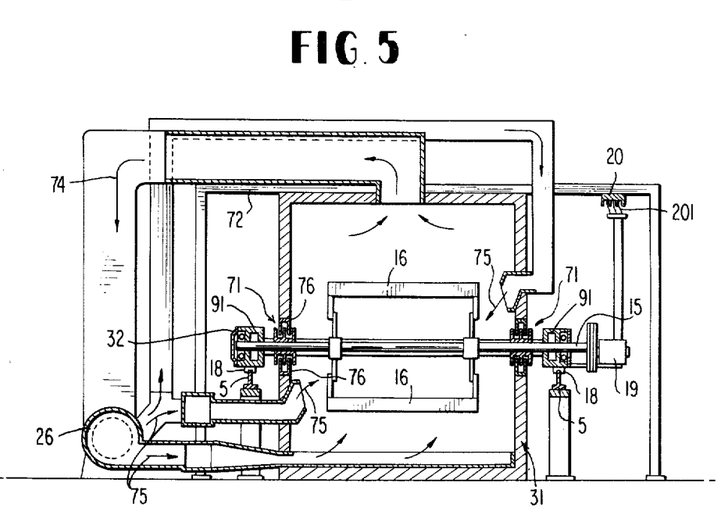
FIG. 5 is a sectional view along lines V — V in FIG. 4.

Referring to FIG. 4 and FIG. 5 a heating furnace for use with the rotational molding apparatus for synthetic resin of this invention is to be described in detail.

The heating means, as shown in FIG. 1 and FIG. 2, is adapted to deliver racks 9, 9... successively into the heating furnace 7 of tunnel type and to melt the synthetic resin material in the molds 16, 16 rotatably mounted on the rack 9.

The heating furnace 7 has a wall of configuration bisected into upper and lower portions both of which are provided with horizontally notched channels 71, 71 over the entire length thereof, the upper wall part being suspended and supported from supports 72, 72 . . . Gas at high temperature in the furnace 7 is sucked by blowers 73, 73 . . . from paths 74, 74 . . . and circulated through each of the blowing paths 75, 75 . . . so as to uniformly heat the molds with good heat efficiency. The high temperature gas from the blowing paths 75', 75'' is blown to the inside of the rotation trace of the molds 16, 16 . . . so as to enable more uniform heating.

The rack 9 is provided with wheels 18, 18 . . . at the both sides thereof so as to travel along the track 5 extended at both of the outsides of the heating furnace 7. The rotating shaft 15 journaled to the rack 9 is detachably mounted with two molds 16, 16 said shaft 15 is interlocked with an electric motor 19 disposed outside of the wheels 18, and a collector brush 201 for receiving the electric power for the electric motor 19 and power supply wires 20 provided along the guide tracks are always kept in contact. By the foregoing configuration, molds 16, 16 can pass through the heating furnace 7 by the aid of a pusher and the like while being rotated. Recesses for water reservoir 91 are provided on the rack 9 so as to cool the bearing portions of the wheels 18 and the rotating shaft 15.

A plurality of parallel heat shield plates 76, 76 . . . are provided over the entire length of the opposing faces of said notched channels 71, 71 and a plurality of parallel heat shield plates 92, 92 . . . are also provided on each of the racks 9 so as to travel with the racks 9 along the guide tracks 5 while bushing them to each other to thereby prevent that the heat is lost from the inside of the furnace 7 by way of said notched channels 71 and protect the bearing portions of the rack 9 and the electric motor 19 from the heating. The adjacent racks 9 are contacted to each other and thus the heat shield plate 92 for each of the racks is continuously connected. With the sealing between the heat shield plates 76 and 92 with sand and the like, better results can be obtained. The racks 9 may be connected in an annular row and travel through the heating furnace while circulating.

Since the electric motor 19 is mounted to each of the racks 9 and the molds 16, 16 are heated in the heating furnace 7 and rotatively driven thereby, the whole mechanism for the rotative driving of the molds can be constructed simply and economically. Moreover, the electric motor 19 having poor tolerance for the heat is protected it is situated outside of the furnace 7. It is economical as well because the electric motor can be protected from the heat by the construction of providing notched channels on the side walls of the heating furnace 7.

Although the construction of the embodiment in which the bearing portions of the rack 9 is also placed outside of the furnace 7 is preferred, only the electric motor 19 may be situated outside of the heating furnace 7 while providing the guide track 5 in the furnace 7 for a practical use where the temperature in the furnace 7 is not so high.

Various types of means can be employed instead of the electric motor 19 for the rotative driving mechanism for molds 16, 16.

Figure 6:
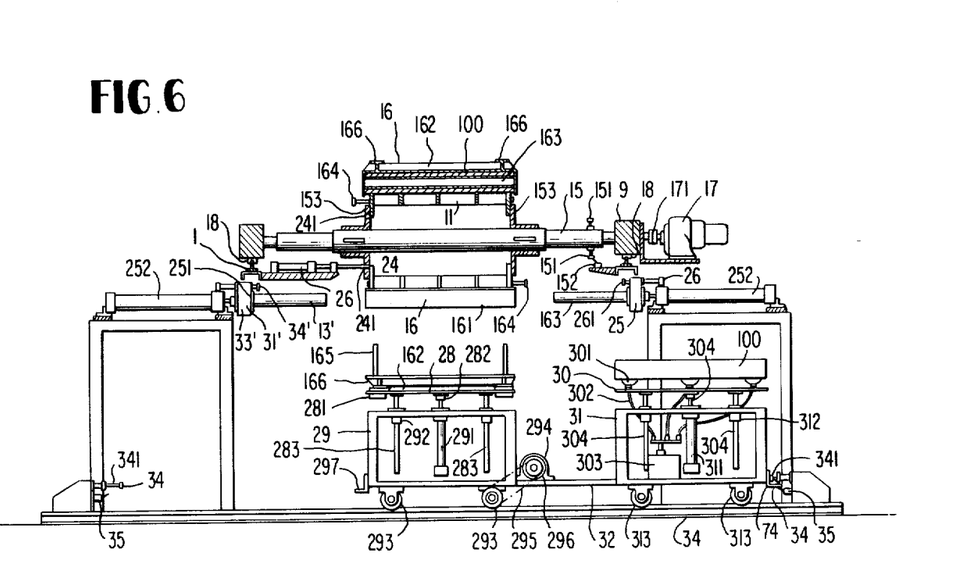
FIG. 6 is a partial sectional view showing one embodiment of the molded article withdrawal device in the synthetic resin molding apparatus according to this invention.
Figure 7:
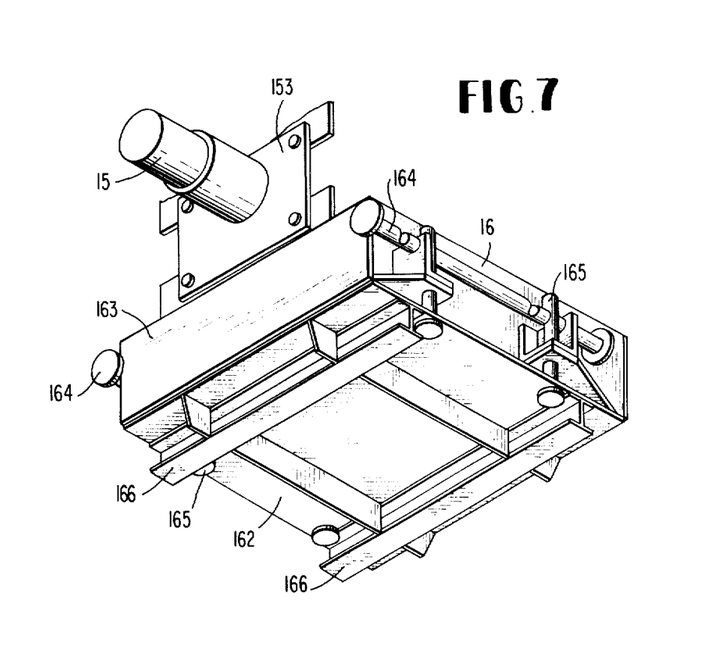
FIG. 7 is a perspective view for the structure of the rotary mold shown in FIG. 6.

The molds and the molded article withdrawal device for use with the rotational molding apparatus of this invention are to be described in details referring to FIG. 6 and FIG. 7 of the accompanying drawing, wherein the reference numerical 16 denotes a rotary mold and said rotary mold 16 comprises two split mold parts 161 and 162 and movable core 163. The rotary mold 16, when closed, forms a mold cavity therein of a desired configuration for the molded article and the molded article 100 is present in said molding cavity.

A mold locking rod is shown as 164 and is adapted to lock said rotary mold 16 when engaged with a mold closing rod 165 and unlocks said rotary mold 16 when it escapes from the engagement with said mold closing rod 165.

One of the split mold part 162 is provided with said mold closing rod 165 along the direction of splitting said mold and also provided with mold attraction plates 166 at the outer surface thereof.

A mold rotating rack 9 for rotatably supporting said rotary mold 16 is shown and it is adapted to travel on the track 1 by the provision of the travelling wheels 18.

A mold rotating shaft 15 for rotating said rotary mold 16 has on one end a switching cam 151 projecting therefrom which actuates a limit switch 152 to stop the driving for the electric motor 17 mounted on the end of said mold rotating rack 9. The electric motor 17 rotates by way of a coupling 171 the mold rotating shaft 15 which, in turn, rotates said mold 16 for the rotational molding by way of arms 153.

The arms 153 which secure said rotary mold 16 to said mold rotating shaft 15 are apertured with positioning apertures 241 being capable of engaging a positioning pins 24 therein, which positioning pins 24 are adapted to engage and disengage with said positioning aperture 241 being expanded and contracted by fixed pin cylinders 26.

Reference numeral 25 denotes an electromagnetic chuck and said electromagnetic chuck 25 is adapted to attract the movable core attraction portion 251 of a movable core 163 in said mold 16 and freely expanded and contracted by way of an expansion cylinder 252. At the upper portion of said electromagnetic chuck 25, a locking cylinder 26 is secured which is extensibly engaged with a projected locking rod 251 and said locking rod 261 is adapted to contact said mold locking rod 164 to move it. An electromagnetic chuck 25', is provided on the position opposed to said electromagnetic chuck 25 and said electromagnetic chuck 25' is provided at the upper portion thereof with unlocking cylinder 27 which is extensibly engaged with a projected unlocking rod 271' and said unlocking rod 271' is adapted to contact said mold locking rod 164 and move it.

The split mold mounting platform 28 and the molded article mounting platform 30 will now be described.

Reference numeral 28 denotes a split mold mounting platform which can mount thereon said split mold part 162 for the moving side and said split mold mounting platform is provided with an electromagnetic chuck 281 which is adapted to attract said one split mold part 162.

Reference numeral 282 denotes a lifting piston rod provided projectingly at the lower surface of said split mold mounting platform 28 around which a lift guiding rod 283 is provided in parallel with said rod 282.

A carriage 29 supports said split mold mounting platform for up and down movement is mounted with a cylinder 291 engaged with said lifting piston rod 282 movably for up and down and a sliding bearing 292, through which said lift guiding rod 283 is inserted for up and down movement is secured around said cylinder 291. 293 and 293' are wheels provided on the lower portion of said carriage 29 and they are adapted to travel along the track 1. The wheels 293 is adapted to rotate by carriage driving motor 294 by way of a chain 295 and a sprocket 296.

Reference numeral 30 denotes a molded article mounting platform which can mount thereon the molded articles 100 casted by way of said rotary mold 16 for the rotational molding. The molded article mounting platform 30 is provided thereon a plural of molded article attraction pads 301 each of which is communicated by way of flexible pipe 302 to a vacuum pump 303 and said molded article attraction pads 301 can attract the article 100 when said vacuum pump 303 operates. A lifting piston rod 304 is provided projectedly at the lower face of said molded article mounting platform 30 and a lifting guide rod 304 is provided in parallel with said lifting piston rod 304 around said rod 504.

Reference numeral 31 denotes a carriage which supports said molded article monting platform 30 movably for up and downward and said carriage is provided with a cylinder 311 engaged with said lifting piston rod 304 movably for up and downard and a sliding bearing 312 is engaged with said lifting guide rod 304 movably for up and downward around said cylinder 311.

313 denotes wheels disposed on the lower portion of said carriage 31 and they are adapted to turn on the track 33. Said carriage 31 is coupled with said carriage 29 by way of a carriage connection portion 32 and when said carriage 29 travels on the track 33 by the electric motor 294, said carriage 31 is also travelled. A switch cam 314 is provided at the lower end of said carriage 31 and adapted to abut with a limit switch 341 mounted at the end of said track 33 and disconnect the power supply for said carriage driving motor 294. Shock absorber means 34 is provided aside of said limit switch 341 at the end of said track 33 so as to absorb the shock through a spring cylinder extensibly engaged with a cushion rod 35 when said carriage 31 abuts the limit switch 341.

Another shock absorber 34' is also provided at the end of the track 33 corresponding to the end of the track 33 provided with said shock absorber 34 and limit switch 341 so as to absorb the shock when the carriage 29 is stopped. Another limit switch 341' is provided which can be engaged by the switch cam 297 provided at the lower portion of said carriage 29.

Taking out the molded articles from molds for rotationally casting by using the molded article withdrawal device having foregoing construction is performed in the manner described below.

A mold rotating rack 9 is moved along track 1 and stopped at a predetermined position to abut a switch cam 151 projectedly provided on a mold rotating shaft 15 of said mold rotating rack 9 to a limit switch 152 to actuate an electromagnetic brake (not shown) incorporated in an electric motor 18 by said limit switch 152 thereby stopping the rotation of said mold rotating shaft 15 so that the molds 16, 16 are stopped above and under the mold rotating shaft 15.

Then, a split mold mounting platform 28 provided below said rotary mold 16 is lifted by a cylinder 291 and lifting piston rod 282, the attitude of the rotary mold 16 is kept horizontal by abutting said platform 28 to the attraction portion 166 of the split mold part 162 and said rotary mold 16 is hindered from the rotation by extending and engaging a positioning pin 24 from a pin cylinder 242 to positioning hole 241 apertured in an arm 153 which supports said rotary mold 16.

Then, electromagnetic chucks 25, 25' are extended from expansion cylinder 252, 252' to abut with movable core attraction portion 251, 251' of movable cores 163, 163' to thereby press the same and unlock mold projecting rod 261' is projected from an unlock cylinder 27' provided on said electromagnetic chuck 25' to move the mold locking rod 164 releasing it from the engagement with a mold closing rod 165. The split mold part 162 is thus split from the other split part 161 and removed from the mold rotating rack.

Then, an electromagnetic chuck 281 of the split mold mounting platform 28 abutted to the lower portion of said one part of the split mold 162 is actuated to tightly attract the split mold atrraction portion 166 and thus lower the lifting piston rod 282 of the cylinder 291 thereby descending said mounting platform 28 to the split mold on the carriage 29 while attracting thereon said splitted mold 162.

The molded article 100 is supported in the mean time by the other part of a split mold 161 and movable cores 163, 163' and, therefore, does not fall to said split mold mounting platform 28.

Then a carriage driving motor 294 on the carriage 29 is driven and hence the carriage 31 connected thereto by way of a carriage connection portion is moved to thereby detach said split mold mounting platform 28 from under the stopping position of said rotary mold 16 and travel along the direction away from the other split mold part 162 supported on the mold rotating rack 9. The molded article mounting platform 30 on said carriage 31 is then moved to under the stopping position of said rotary mold 16. When the carriages 29 and 31 are moved to a predetermined positions, a switch cam 297 provided projectedly on the lower end of said carriage 29 abuts to a limit switch 341' provided on the end of the track 33 and said limit switch 341' actuates the electromagnetic brake (not shown) incorporated in said carriage driving electric motor 294 to stop the travelling of the carriages 29 and 31. The carriages 29 and 31 are then stopped slowly abutting to the shock absorber 34' provided on the end of the track 34'.

Then, the molded article mounting platform 30 having moved to under the split mold part 161 supported under the rotating rack 9 is lifted by way of the lifting cylinder 311 and the lifting piston rod 304 and abutted to the molded article 100 which is supported by the movable cores 163, 163' of the split mold 161. There-after, electromagnetic chucks 25, 25' and expansion cylinders 252, 252' are operated to pull off the movable cores 163, 163' so that molded article 100 may be placed on said molded article mounting platform 30, and molded article attraction portion 301 provided on said molded article mounting platform 30 is caused to attract to the molded article driven by a vacuum pump 303, and a lifting piston rod 304 of the cylinder 311 is lowered to thereby descend said molded article mounting platform on the carriage 31 while said molded article 100 still being attracted onto said molded article mounting platform 30.

Then, the carriage driving electric motor 294 of the carriage 29 is driven again causing the carriages 29 and 31 to travel to thereby detach said molded article mounting platform 30 from under the stopping position of said split mold 161 and travel in the direction away from said the other split mold part 161. When the carriage 31 travels to a predetermined position, a switch cam 314 projectedly provided on the lower end of said carriage 31 is abutted to a limit switch 341' and said limit switch 341' actuates an electromagnetic brake (not shown) incorporated in said carriage driving electric motor 294 to stop the carriages 29 and 31. Then the carriages 29 and 31 are stopped slowly by abutting to the shock absorber 34 provided at the end of the track. The molded article 100 provided on the molded article mounting platform 30 on the carriage 31 that is stopped at a predetermined position is released from the molded article attraction portion 301 and detached from said mounting platform 30.

Resin material previously prepared for rotational molding is fed into the inside of the moving part of split mold 162 mounted on the split mold mounting platform 28 of the other carriage 29, the split mold mounting platform 28 is moved to under the split mold part 161 raised to abut to said split mold part 161. While at the same time the movable cores 163, 163' are moved from the side to the center, and the rotary mold 16, after closed, is locked by the locking rod 164 to thereby prepare for the next rotational molding.

Although it is preferred that the core pulling out means provided at the side of the stopping position of the mold comprises as in said example, an electromagnetic chuck 25 and an expansion cylinder 252 that extensively supports said electromagnetic chuck 25, but a movable core chucking tool may be extensibly supported instead of said electromagnetic chuck by said expansion cylinder 252.

The expansion apparatus may comprise a pinion and rack instead of the expansion cylinder 252.

In the present invention, the lifting piston rod engaged for up and down movement to the cylinder as shown in foregoing embodiment is desired for the means to raise and lower the mounting platforms for the split mold and the molded article, a lifting mechanism comprising a pinion and rack mechanism may be provided instead.

For the means to detach said mounting platforms for the split mold and the molded article from or to under the split mold, it is desired as shown in the foregoing embodiment to travel the carriage that supports the split mold mounting platform and the carriage that supports the molded article mounting platform along the track, but a reciprocating sliding platform that moves along a guiding surface as conventionally adopted in machine tools may be used instead of these carriages.

The electric motor with the electromagnetic brake as a power source for travelling the carriages may not always be disposed on the carriages but disposed on the floor surface, wherein said carriages are moved by engaging the pinion gear being capable of rotating by the motor to the teeth of a rack provided on the carriage.

In mounting the moving part of split mold on the split mold mounting platform in this invention, it is desired to provide an electromagnetic chuck on said mounting platform as described in the foregoing embodiment, but said electromagnetic chuck may be omitted if the weight of the moving part of said split mold to be mounted on the split mold mounting platform is sufficiently great and said moving part of split mold can be mounted on the split mold mounting platform for due to the dead weight thereof.

In mounting the molded article on the molded article mounting platform in this invention, it is desired to provide article attraction pads on said mounting platform as described in the foregoing embodiment, but a molded article chuck tool capable of engaging with the uneveness in the molded article may be provided on said mounting platform instead of said article attraction pads so asa to grasp the article by the operation of said chuck tool.

In the rotational molding of this invention the molded articles can be taken out by carrying away one of the split mold parts mounting on the split mold mounting platform and thereafter placing the molded articles left in the other part of the split mold parts on the molded article mounting platform. It is not required to detach the whole of the mold from the rotating rack and this enables the rapid withdrawal of the molded article.

Figure 8:
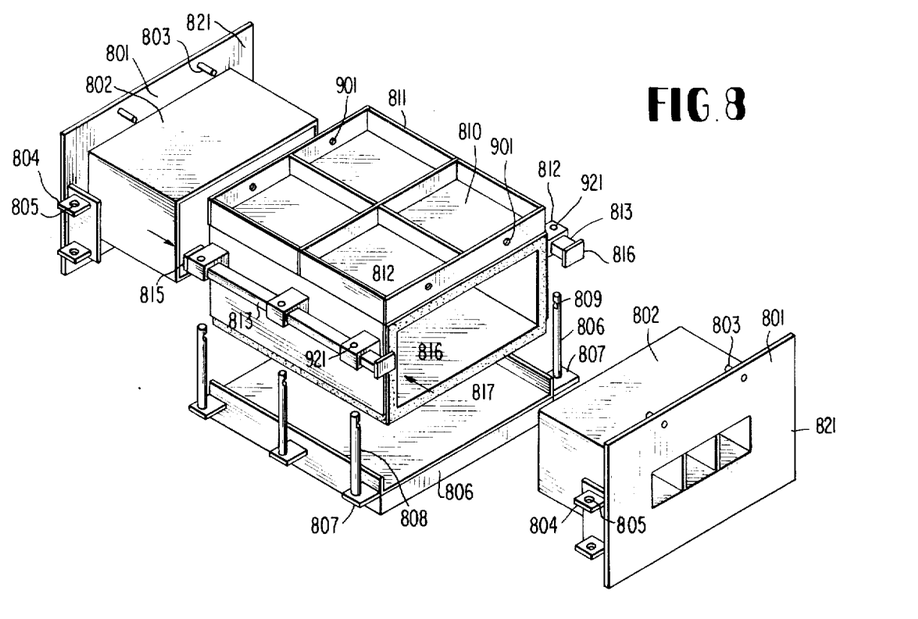
FIG. 8 is a perspective view of another embodiment of the mold in the split state for use with this invention.

Other examples for the mold for use with the rotational molding apparatus for synthetic resin according to this invention is to be described referring to FIG. 8, wherein insertion molds 801 are provided with core mounting plates 821 at the outer ends thereof. There are also shown cores 802 provided on said insertion molds 801, core positioning pins 803 provided projectedly on the lower and upper portions of the core mounting plates 821, core stopping portions 804 provided on both peripheries of said core mounting plates 821, engaging holes 805 apertured in said core stop portions 804. There are also shown a mold part 806 constituting the mold for use with this invention illustrated below in the drawing, projecting plates 807 formed on the back to back outer sides of said mold part 806, a plurality of engaging rods 808 projecting from said projecting plates 807 in parallel with the direction of closing said mold part 806 (shown upwardly in the drawing), locking rod stopping notches 809 provided at the same high of each engaging rod 808, a mold part 810 constituting the mold for use with this invention and being capable of slitting and closing with said mold part 806, stiffening flanged strips 811 projecting from said mold part 810, pin engaging holes 901 apertured in said stiffening flanged strips 811 at the sides facing to said insertion mold parts 801, stop members 812 projectedly provided at the opposing outer sides of said mold part 810, engaging holes 921 apertured in said stop members 812 and adapted to insert therethrough said engaging rods 808, locking rod insertion holes 922 apertured through each of the sides of said stop members 812. locking rods 813 inserted through said insertion holes 922, engaging rod insertion notches 814 formed in said locking rods 813 and adapted so as to align with said engaging apertures 921 and insert therein said engaging rods 808, and end plates 815, 816 formed at both ends of said locking rods 813.

Figure 9:
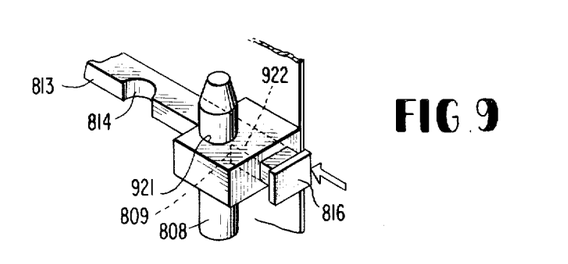
FIG. 9 is a partial enlarged view of FIG. 8.
Figure 10:
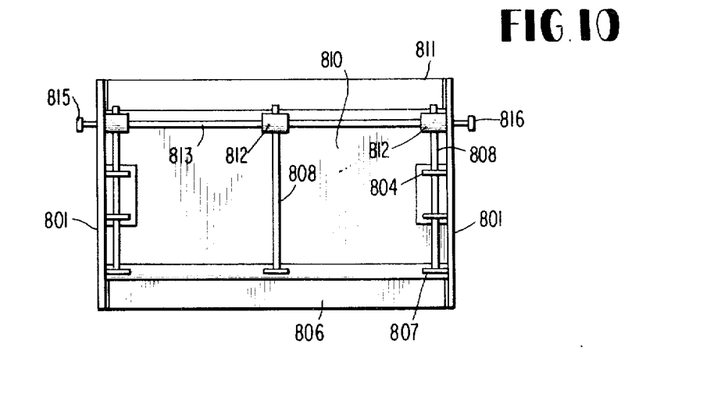
FIG. 10 is a front view of the mold as shown in FIG. 8 in closed state.

In closing the mold of this invention of the foregoing structure, insertion molds 801 are bushed with the mold part 810 so that the core positioning pins 803 of the two mating insertion molds 801 may engage with the pin engaging holes 901 of the mold part 810, the engaging holes 921 apertured in the stop members 812 of said mold part 810 and engaging holes 805 apertured in the core stop portions 804 of said insertion molds 801 are arranged in straight lines, engaging rods 808 of said mold part 810 are inserted into both of said engaging holes 921 and engaging holes 805, the locking rod stopping notches 809 of said engaging rods 808 are kept to a position aligning with the locking rod insertion holes 922 apretured in the stop members 812 of said mold part 810, and then the locking rods 813 are moved in the direction of the arrow A to engage said locking rod 813 excepting the notched portion to said locking rod stopping notches 809 thereby preventing said engaging rods 808 from pulling out of said engaging holes 921. Then, the mold part 806 is closed to the mold part 810 so as not to be split and the corresponding two insertion molds 801 are also completely closed to the mold part 810 not detachably because said engaging rods 808 are inserted into said engaging holes 805 and stopped therein.

The mold of this invention closed as above can be split by pressing the end plates 815 of the locking rods 813 to move said locking rods 813 in the direction shown by the arrow B, aligning the engaging rod insertion notches 814 of said locking rods 813 with the locking rod stopping notches 809 of the engaging rods 808, and pulling out said engaging rods 808 from the engaging holes 921. Then, the mold part 806 is gradually detached from the mold part 810 and subsequently said engaging rods 808 of said mold part 806 are also pulled out from said engaging holes 805 of two opposing insertion molds 801 whereby said insertion molds 801 can also be detached to the side of the mold part 810. The core positioning pins 803 of said insertion molds 801 are then pulled out from the pin engaging holes 901 of the mold part 810.

In the foregoing embodiment, a pair of insertion molds are provided in addition to two splittable mold parts, but the present invention is of course applicable to such a case where the mold cavity is formed by closing only two mold portions, that is, where no insertion molds are used.

The insertion molds 813 are provided with partition walls 819, 820 and said partition walls 819, 820 partition the cavity in said insertion molds 813 to establish a path for the heated fluid. For the fluid for heating the molds 810, heated steam and hot blow are used. The heated fluid is fed through the entrance of the cavity opening to the outside of the insertion mold 813 to the inside, passes through communication channels for heated fluid formed with partition walls 819, 820, heats insertion molds 813 and leaves therefrom. Since the insertion molds are formed with cavity opening to the outside of said molds and the end of the communicating pipe of the heated fluid in the heating furnace is opened to said cavity of the insertion molds opening to the outside of the mold, the insertion molds are heated internally by way of the heated steam of not blow fed to the cavity of the insertion molds from the opening of said communication pipe for the heated fluid and thermoplastic resin material which forms the cavity of the molded articles are thoroughly heated and melted to produce desired thermoplastic resin molded articles formed with cavities with good quality.

We claim:

1. A synthetic resin molding apparatus comprising a first guide track extended between a molded article withdrawal station and a material feeding station, a plurality of second guide tracks arranged substantially in parallel relation with said first guide track and respectively passing through heating furnaces and cooling chambers, and third guide tracks provided on the both sides of said first and second guide tracks mounted with carriages capable of reciprocating in the direction substantially perpendicular to said first and second guide tracks and having rack carrying tracks capable of joining said first and second guide tracks, aforesaid tracks forming together a plurality of circulating paths consisting of the material feeding station, the heating furnace, the cooling chamber, and the molded article withdrawal station arranged successively while utilizing said material feeding station and said molded article withdrawal station in common, and a plurality of racks having drive means thereon for rotating the mold and moving the racks along said circulating paths through a plurality of stations to thereby melt and mold the synthetic resin while moving said molds and racks along said circulating paths.

2. A rotational synthetic resin molding apparatus as defined in claim 1 having heating furnaces and racks characterized in that said racks are provided with driving source mechanisms for the rotation of molds and self travelling at the side thereof, said driving source mechanism and said molds properly spaced apart, said heating furnaces provided with notched channels in the horizontal direction over the entire length of their side walls so that the racks carrying said molds can pass through the furnaces while the molds and the driving source mechanisms are located inside and outside of the furnaces respectively.

3. A heating furnace as defined in claim 2 characterized in that a plurality of heat shield plates parallel to each other are provided over the entire length of the both of the opposing faces of the notched portions formed in the heating furnace, said heat shield plates being parallel to said notched portions.

4. A rack as defined in claim 2 characterized in that a plurality of heat shield plates parallel to each other are provided on the locations corresponding to the notched portions of the heat furnace and parallel thereto in an overlapping arrangement.

5. A synthetic resin molding apparatus comprising; a first guide track extended between a molded article withdrawal station and a material feeding station, a plurality of second guide tracks arranged substantially in parallel with said first guide track and respectively passing through heating furnaces and cooling chambers, and third guide tracks provided on the both sides of said first and second guide tracks mounted with carriages capable of reciprocating in the direction substantially perpendicular to said first and second guide tracks and having rack carrying tracks capable of joining said first and second guide tracks, aforesaid tracks forming together a plurality of circulating paths consisting of the material feeding station, the heating furnace, the cooling chamber, and the molded article withdrawal station arranged successively while utilizing said material feeding station and said molded article withdrawal station in common, a plurality of racks for rotating with and moving the molds along said circulating paths to thereby melt and mold the synthetic resin while moving said molds and racks along said circulating paths, wherein said molds are rotatably supported on the racks, one of two splittable mold parts constituting said molds detachable from the rotating racks at the time of splitting and the other part is supported as it is on the racks, a split mold mounting platform located for up and downward movement below the rotary molds supported by said racks, said split mold mounting platform adapted to move in the direction away from said the other split mold part supported on the racks after placing thereon the splitted molds, a molded article mounting platform located for up and downward movement below said other split mold part after the movement of said split mold mounting platform, and said molded article mounting platform adapted to move in the direction away from the other split mold part.

6. A synthetic resin molding apparatus comprising; a first guide track extended between a molded article withdrawal station and a material feeding station, a plurality of second guide tracks arranged substantially in parallel with said first guide track and respectively passing through heating furnaces and cooling chambers, and third guide tracks provided on the both sides of said first and second guide tracks mounted with carriages capable of reciprocating in the direction substantially perpendicular to said first and second guide tracks and having rack carrying tracks capable of joining said first and second guide tracks, aforesaid forming together a plurality of circulating paths consisting of the material feeding station, the heating furnace, the cooling chamber, and the molded article withdrawal station arranged successively while utilizing said material feeding station and said molded article withdrawal station in common, a plurallity of racks for rotating with and moving the molds along said circulating paths to thereby melt and mold the synthetic resin while moving said molds and racks along said circulating paths, wherein said mold comprises two mold parts capable of splitting and closing, one of said two mold parts having at the back to back outer sides thereof projected plates provided with engaging rods projecting in parallel with the direction of closing said mold parts, the other mold part having stop portions respectively projecting outwardly provided with engaging holes capable of inserting said engaging rods therethrough, said stop portions being respectively apertured with the locking rod insertion holes which intersect said engaging holes, said locking rod insertion holes being inserted with locking rods formed with engaging rod insertion notches aligning with said engaging holes, and the locking rod stopping notches being provided on the said engaging rod at the faces opposed to said locking rods.

7. A synthetic resin molding apparatus comprising; a first guide track extended between a molded article withdrawal station and a material feeding station, a plurality of second guide tracks arranged substantially in parallel with said first guide track and respectively passing through heating furnaces and cooling chambers, and third guide tracks provided on the both sides of said first and second guide tracks mounted with carriages capable of reciprocating in the direction substantially perpendicular to said first and second guide tracks and having rack carrying tracks capable of joining said first and second guide tracks, aforesaid tracks forming together a plurality of circulating paths consisting of the material feeding station, the heating furnace, the cooling chamber, and the molded article withdrawal station arranged successively while utilizing said material feeding station and said molded article withdrawal station in common, a plurality of racks for rotating with and moving the molds along said circulating paths to thereby melt and mold the synthetic resin while moving said molds and racks along said circulating paths, wherein said racks are provided with driving source mechanisms for the rotation of molds and self moving at the side thereof, said driving source mechanism and said molds properly spaced apart, said heating furnaces provided with notched channels in the horizontal direction over the entire length of their side walls so that the racks can pass through the furnaces while the molds and the driving source mechanisms are located inside and outside of the furnaces respectively and liquid reservoir recesses for the cooling are provided in each of the bearing portions for the wheel shaft and rotating shaft of the racks.

* * * * *